US008990467B2

(12) United States Patent
Saito

(10) Patent No.: US 8,990,467 B2
(45) Date of Patent: Mar. 24, 2015

(54) PRINTING APPARATUS AND OPERATION SETTING METHOD THEREOF

(75) Inventor: Tadao Saito, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 602 days.

(21) Appl. No.: 13/249,118

(22) Filed: Sep. 29, 2011

(65) Prior Publication Data

US 2012/0086968 A1    Apr. 12, 2012

(30) Foreign Application Priority Data

Oct. 12, 2010   (JP) ................................ 2010-230097

(51) Int. Cl.
*H05K 7/10* (2006.01)
*G06F 3/12* (2006.01)

(52) U.S. Cl.
CPC .............. *G06F 3/1279* (2013.01); *G06F 3/122* (2013.01); *G06F 3/1221* (2013.01); *G06F 3/1229* (2013.01)
USPC ............................. 710/301; 710/14; 710/302

(58) Field of Classification Search
USPC .......................................... 710/14, 301–302
See application file for complete search history.

(56) References Cited

U.S. PATENT DOCUMENTS

| | | | |
|---|---|---|---|
| 6,363,493 B1* | 3/2002 | Williams | 714/1 |
| 6,820,157 B1* | 11/2004 | Eide et al. | 710/303 |
| 2005/0091437 A1* | 4/2005 | Yang et al. | 710/313 |
| 2005/0172037 A1 | 8/2005 | Downing et al. | |
| 2006/0114918 A1 | 6/2006 | Ikeda et al. | |
| 2006/0187480 A1* | 8/2006 | Tsuchiya et al. | 358/1.13 |
| 2006/0277344 A1 | 12/2006 | Yasui et al. | |
| 2007/0130407 A1* | 6/2007 | Olson et al. | 710/305 |
| 2008/0263245 A1* | 10/2008 | Hsieh | 710/106 |
| 2009/0292849 A1* | 11/2009 | Khoo | 710/301 |
| 2012/0198102 A1* | 8/2012 | Saito | 710/14 |

FOREIGN PATENT DOCUMENTS

JP   2006-338380 A   12/2006

* cited by examiner

*Primary Examiner* — Nimesh G Patel
(74) *Attorney, Agent, or Firm* — Fitzpatrick, Cella, Harper & Scinto

(57) ABSTRACT

This invention is directed to enhancement of flexibility when connecting an add-in card conforming to the PCI-Express specification. More specifically, the operation mode of the system board of a printing apparatus is configured to cope with both a root-complex and end-point. When an add-in card is inserted into an extension slot, the type of add-in card is discriminated by confirming the ON state of a detection pin. When the inserted add-in card operates as a root-complex, the system board is set to operate as an end-point. When the inserted add-in card operates as an end-point, the system board is set to operate as a root-complex.

10 Claims, 19 Drawing Sheets

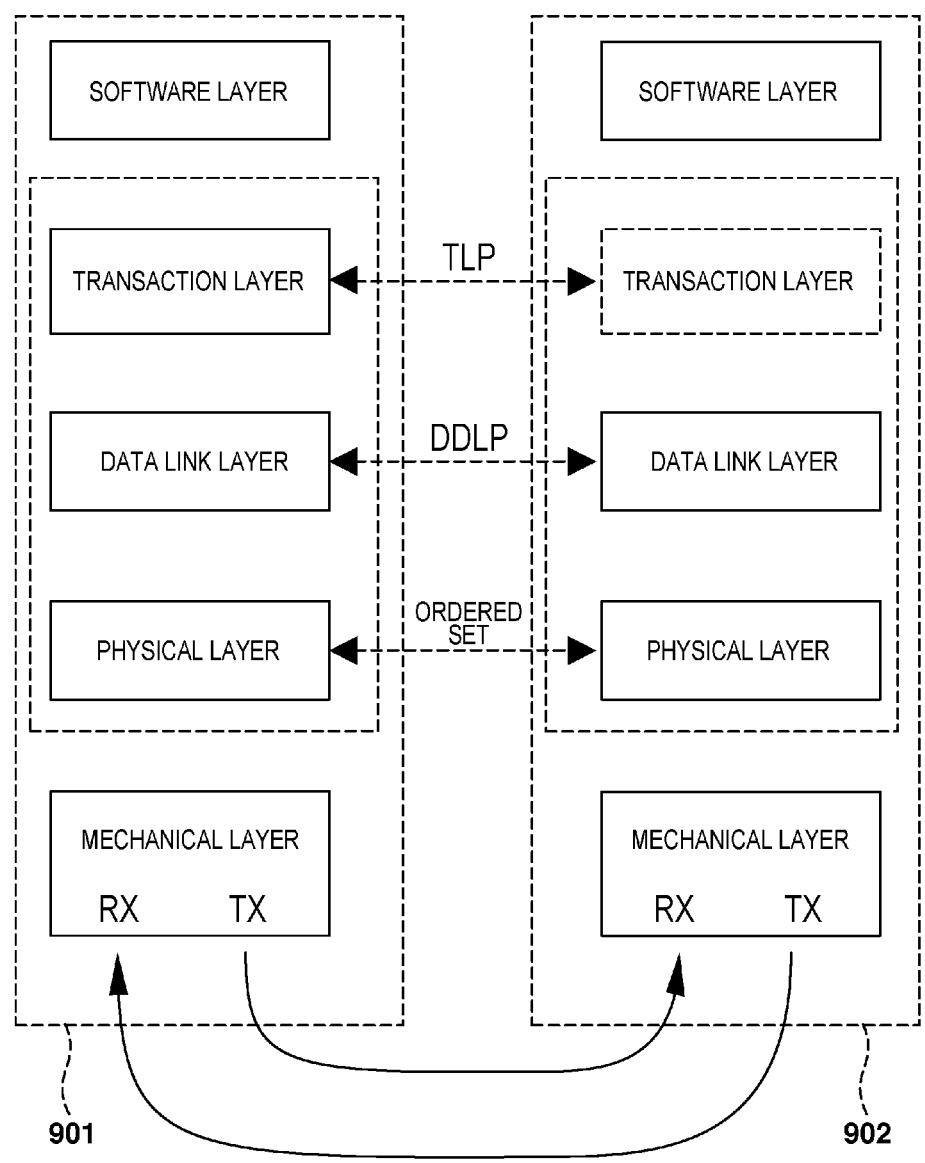
F I G. 1

F I G. 8
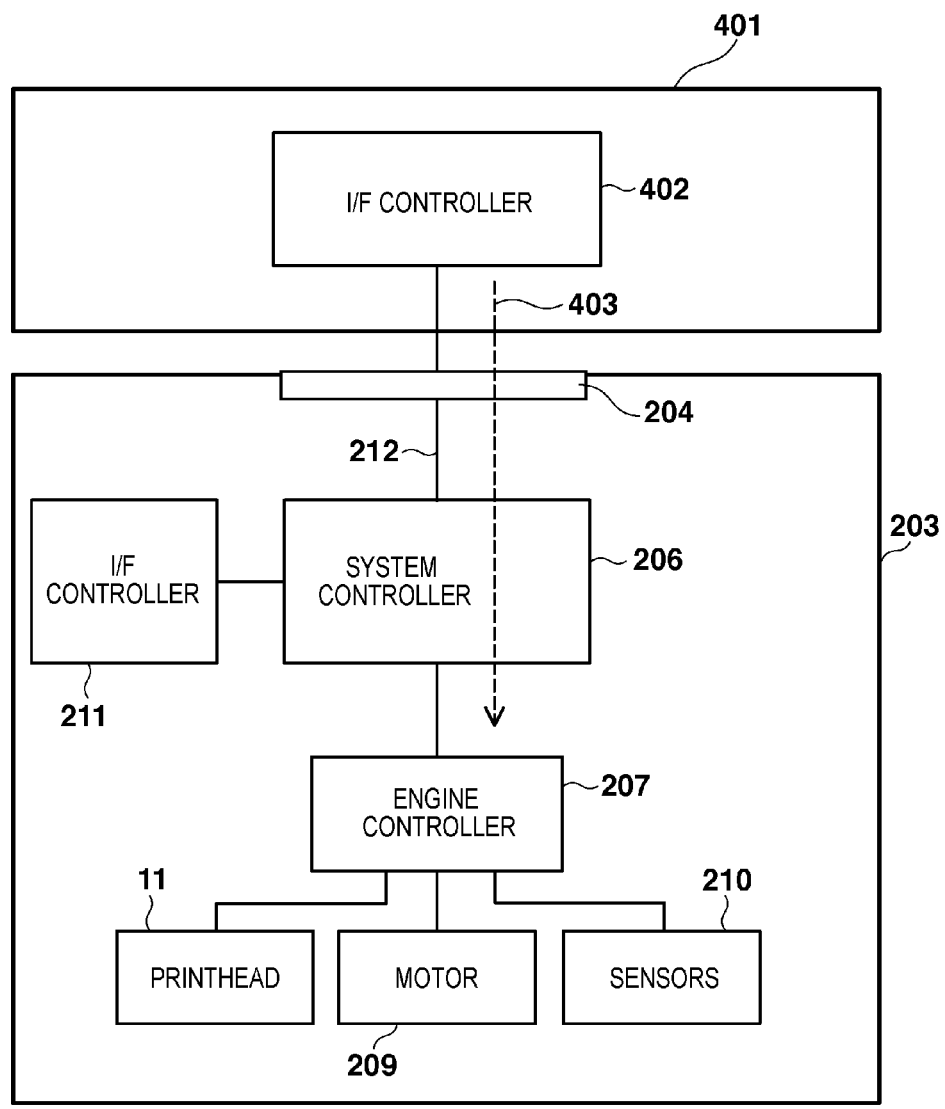

F I G. 10

| | ADD-IN CARD MOUNTED IN EXTENSION SLOT | | | |
|---|---|---|---|---|
| | CARD SHOWN IN FIG. 9A | CARD SHOWN IN FIG. 9B | CARD SHOWN IN FIG. 9C | UNMOUNTED |
| PRSNT#2(x1) | L | H | L | H |
| PRSNT#2(x4) | H | L | L | H |
| DETECTION SIGNAL LINE | L | L | H | L |
| POWER SUPPLY CONTROL LINE | H | H | H | L |

F I G. 12
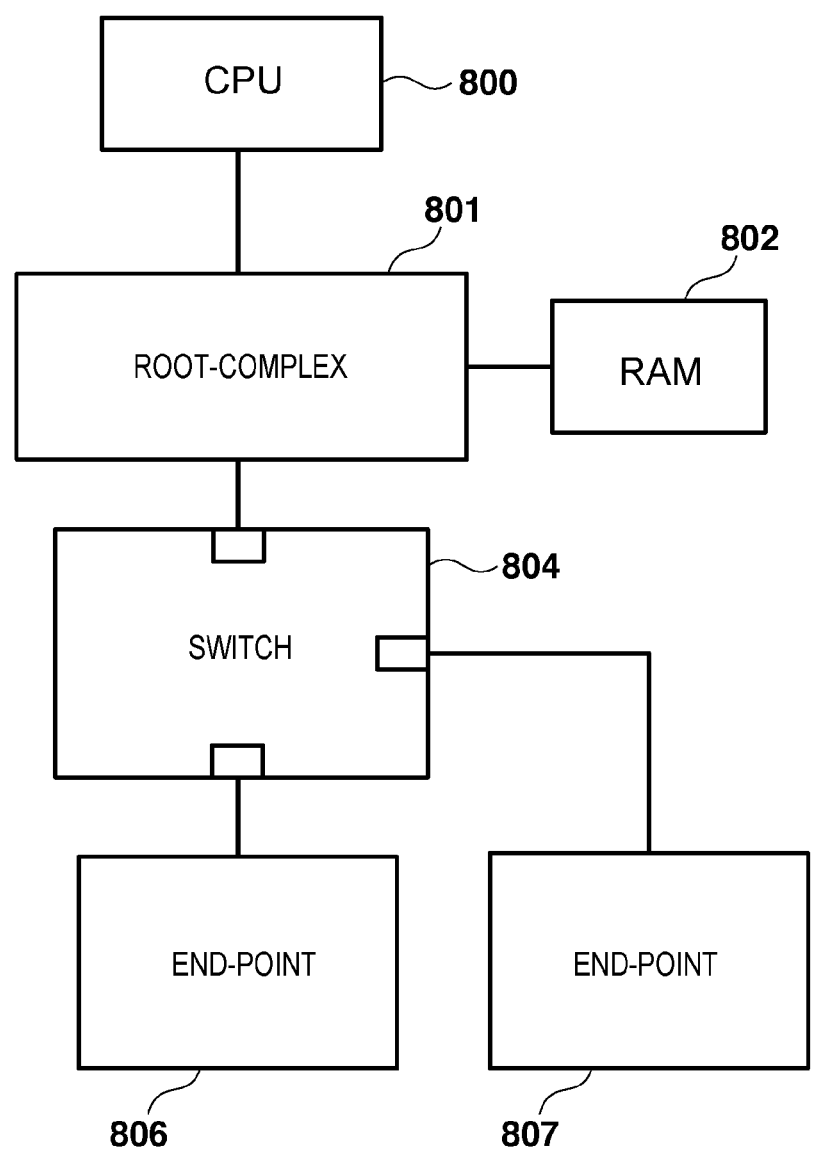

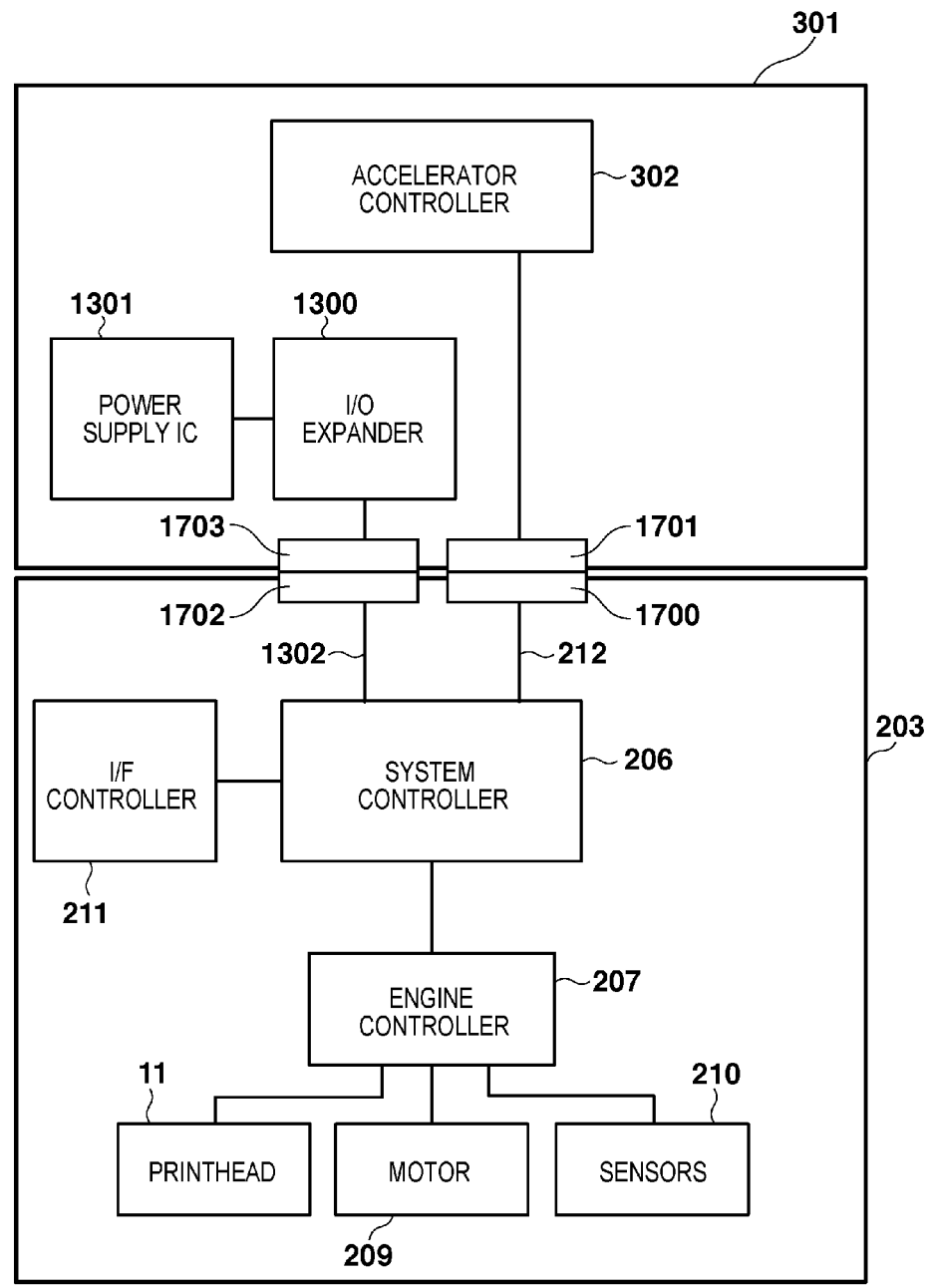
F I G. 17

PRINTING APPARATUS AND OPERATION SETTING METHOD THEREOF

BACKGROUND OF THE INVENTION

1. Field of the Invention

The present invention relates to a printing apparatus and operation setting method thereof. Particularly, the present invention relates to a printing apparatus capable of functional enhancement by adding a card or board and an operation setting method thereof.

2. Description of the Related Art

As a high-speed serial interface, a PCI-Express® interface, which is a succeeding specification of the PCI bus system, has been proposed (see, for example, United States Patent Application Publication Nos. 2006/0114918, 2006/0277344, and 2005/0172037). A PCI-Express serial bus has an advantage of reducing the hardware cost because the number of signals is smaller than that in a PCI parallel bus. For example, the number of wires (signal lines) on a board can be reduced, and the substrate area and connector size can be decreased. PCI-Express can simultaneously provide a bandwidth twice or more that of the PCI and thus can meet demands for higher speed and higher performance. Since PCI-Express employs point to point connection, extension of the system configuration is implemented by performing port extension by a switch and transferring packets.

FIG. 12 is a block diagram exemplifying a data transfer system using PCI-Express. This system includes a CPU 800, a root-complex 801, a RAM 802, a switch 804, and two end-point devices 806 and 807.

The root-complex 801 is the top layer of the PCI-Express hierarchy. The root-complex 801 connects the CPU 800 and RAM 802, and is connected to the end-point devices 806 and 807 via the switch 804. The root-complex 801 includes a GMCH (Graphic Memory Controller Hub) in a computer system.

PCI-Express defines a hot plug as a basic specification. A specification between an add-in card and a motherboard is defined as a card electromechanical specification (generally called a CEM specification). A signal pin is assigned to a connector for implementing a hot plug.

The CEM specification is premised on that the add-in card serves as an end-point and the motherboard serves as a root-complex. If the add-in card serves as a root-complex, a connection fails. Setting the motherboard as an end-point can cope with a case in which the add-in card serves as a root-complex. However, the connection fails when the add-in card serves as an end-point.

For example, when the printer controller of an inkjet printing apparatus uses a board which employs the PCI-Express specification, and the motherboard is defined as a root-complex, only an add-in card set as an end-point can be connected. When the motherboard is set as an end-point, only an add-in card set as a root-complex can be connected.

In this way, the connectable relationship between the system board (motherboard) and the add-in card does not have a high degree of freedom. Flexibility is poor in functional enhancement and the like of the inkjet printing apparatus.

SUMMARY OF THE INVENTION

Accordingly, the present invention is conceived as a response to the above-described disadvantages of the conventional art.

For example, a printing apparatus and operation setting method thereof according to this invention are capable of dynamically switching the operation setting in accordance with the setting operation of an add-in card and facilitating flexible functional enhancement.

According to one aspect of the present invention, there is a printing apparatus capable of functional enhancement by inserting an add-in card, comprising: an extension slot to which the add-in card is inserted; a determination unit configured to determine whether or not the add-in card has been mounted in the extension slot; a discrimination unit configured to discriminate a type of the mounted add-in card when the determination unit determines that the add-in card has been mounted; and a switching unit configured to switch over an operation setting mode of a controller of the printing apparatus to enable an operation of the add-in card in accordance with a result of discrimination by the discrimination unit.

According to another aspect of the present invention, there is an operation setting method of a printing apparatus including an extension slot to which an add-in card is inserted, to achieve functional enhancement by inserting the add-in card, comprising: determining whether or not the add-in card has been mounted in the extension slot; discriminating a type of the mounted add-in card when it is determined that the add-in card has been mounted; and switching over an operation setting mode of a controller of the printing apparatus to enable an operation of the add-in card in accordance with a result of the discrimination.

The invention is particularly advantageous since the operation setting mode of the controller of a printing apparatus is dynamically switched over in accordance with the type of mounted add-in card, and flexible functional enhancement by an add-in card can be easily achieved.

Hence, functional enhancement of the printing apparatus can be easily implemented by, for example, inserting a PCI-Express add-in card.

Further features of the present invention will become apparent from the following description of exemplary embodiments (with reference to the attached drawings).

BRIEF DESCRIPTION OF THE DRAWINGS

FIG. 1 is a block diagram showing a state in which two components are connected using PCI-Express, and a PCI-Express layer structure.

FIG. 8 is a block diagram showing a schematic control arrangement when an extension interface board is mounted on a system board.

FIG. 10 is a table showing the relationship between high and low signal voltage levels of input and output signals in an add-in card detector.

FIG. 12 is a block diagram exemplifying a data transfer system using PCI-Express.

FIG. 17 is a block diagram showing a schematic arrangement when an accelerator board 301 is mounted on a system board 203 according to a third embodiment.

DESCRIPTION OF THE EMBODIMENTS

Figure 2:
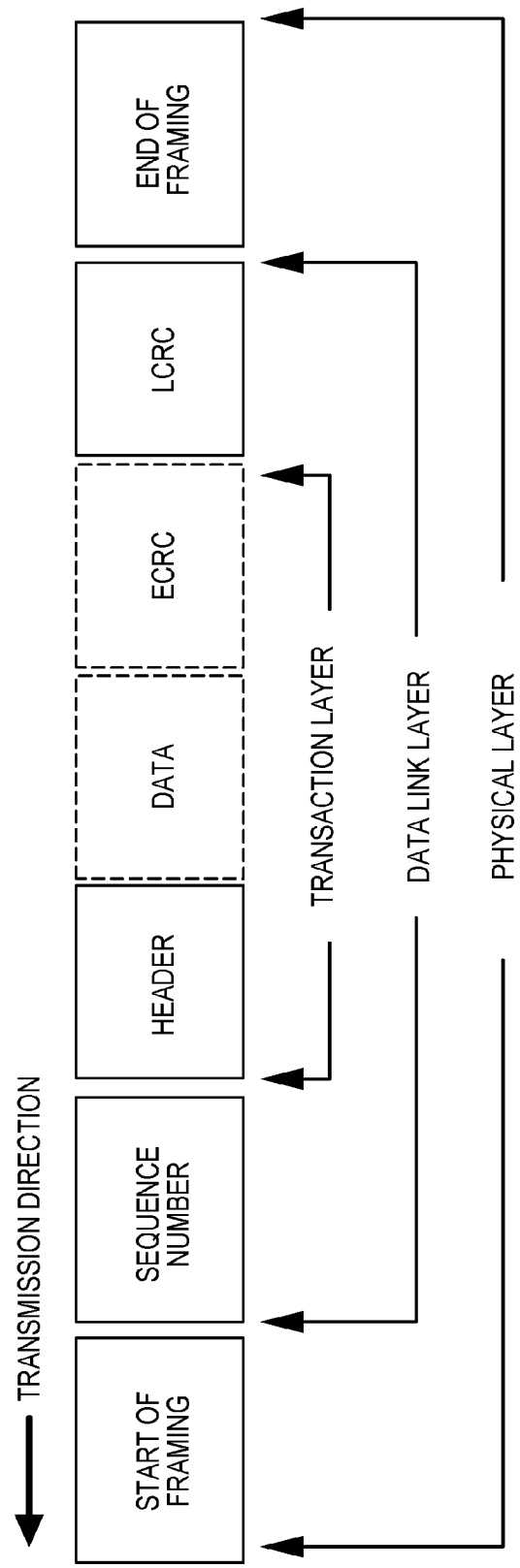
FIG. 2 is a view showing a state in which the structure of TLP generated in the transaction layer is corrected while it is transferred through the data link layer and physical layer.

An exemplary embodiment of the present invention will now be described in detail in accordance with the accompanying drawings.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

After the description of the outline of the PCI-Express specification, an inkjet printing apparatus as an exemplary embodiment of the present invention will be described.

[Outline of PCI-Express Specification]

First, an outline of PCI-Express which is a new specification of a PCI serial bus will be explained while excerpting part of the above-mentioned references, United States Patent Application Publication Nos. 2006/0114918, 2006/0277344, and 2005/0172037.

PCI-Express has the following features:
serial communication by point to point connection
differential low voltage signaling
fine power control
packet-based protocol
connection between a plurality of devices by a switching device
wide data bandwidth, high expandability, and high flexibility
error detection by CRC and data coding
PCI-compatible software model and address space FIG. 1 is a block diagram showing a state in which two components are connected using PCI-Express, and a PCI-Express layer structure. As shown in FIG. 1, the physical layer initializes a link between two components 901 and 902 on the link, and manages the low-level operations of data transfer and power-saving functions. The data link layer provides the transaction layer with a reliable data transfer service and a communication mechanism capable of flow control and power link management with low overhead.

Data packets generated and consumed in the data link layer are called data link layer packets (DLLP). The transaction layer generates and consumes data packets used for implementation of a load/store data transfer mechanism. Further, the transaction layer manages flow control of these packets between the two components on the link. Data packets generated and consumed in the transaction layer are called transaction layer packets (TLP).

FIG. 2 is a view showing a state in which the structure of TLP generated in the transaction layer is corrected while it is transferred through the data link layer and physical layer.

A header indicates the type of packet. In some TLPs, data follows the header and ECRC is added after the data. When a packet to which the transaction layer adds the header and ECRC is transferred to the data link layer, the data link layer adds a sequence number and LCRC. The data link layer on the receiving side uses the sequence number to confirm whether or not all packets have arrived, and LCRC to confirm whether or not the contents of the packet have not changed. Finally, TLP is transferred to the physical layer. The physical layer converts TLP from a byte sequence of 8 bits into a symbol sequence of 10 bits, and adds framing symbols to the start and end.

The symbol sequence is transmitted to another component via a link, and pieces of information added to TLP are removed in an order opposite to that on the transmitting side.

Upon power-on or link establishment by a reset or the like, the physical layer performs initialization called a training sequence. Then, the data link layer performs initialization of flow control.

Figure 3:
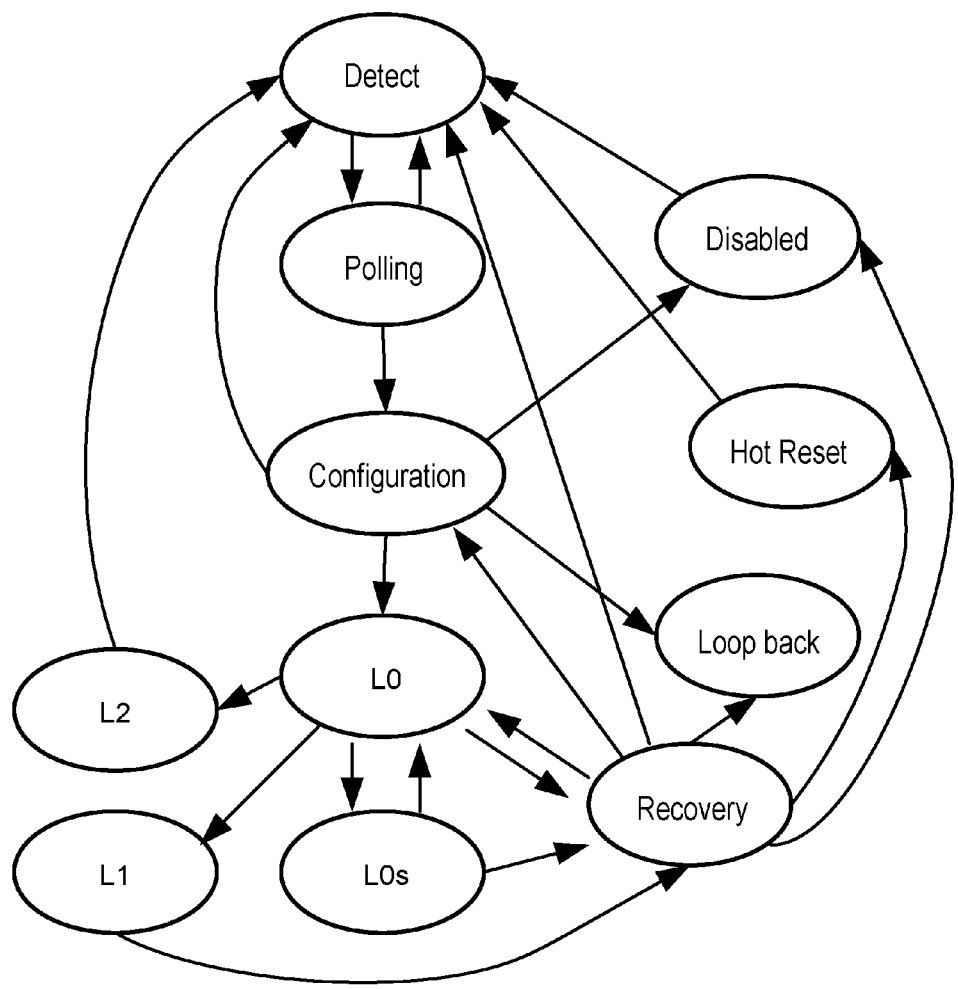
FIG. 3 is a view showing an LTSSM state.

FIG. 3 is a view showing the state of an LTSSM (Link Training and Status State Machine). The state machine performs state management including link initialization, training, and recovery from an error. The link training aims at determination of the number of lanes and establishment of a link. The link training starts from a connected device "Detect" state, and determines link numbers, the number of lanes, and lane numbers. The training sequence is formed from an ordered set of signals between physical layers. The link width, link data rate, and the like are automatically determined without the mediacy of software. After the link training ends normally, initialization of flow control automatically starts. In initialization of flow control, credits between links are communicated to recognize the buffer capacities of the communication parties. After the end of this sequence, a link-up state is set, and TLP can be communicated. The respective states of the state machine will be described below.

"Detect" State

In the "Detect" state, a remote receiver is detected. If a receiver is detected, the state shifts to the "Polling" state.

"Polling" State

The training sequence is transmitted/received to establish bit synchronization and symbol synchronization. Also, the lane polarity is detected, and the data rate is finalized.

"Configuration" State

The lane configuration of a link is established by transmitting/receiving the training sequence. If lane disable or loopback is designated, the "Configuration" state shifts to the designated state. If the "Configuration" state normally ends, it shifts to the "L0" state.

"Recovery" State

A link is recovered.

"L0" State

The "L0" state is a normal operation state, and control packets and data packets can be transmitted/received. All power control states ("L0s"/"L1"/"L2") start from the "L0" state.

"L0s" State

The "L0s" state is defined to reduce power consumption, and the state can switch quickly between the "L0s" and "L0" states without passing through the "Recovery" state.

"L1" State

Power consumption can be reduced much more than in "L0s". However, the "L1" state returns to the "L0" state via the "Recovery" state. Transition to the "L1" state is performed in response to an instruction from the data link layer and an ordered set.

"L2" State

Power consumption can be reduced much more than in "L1". In this state, a transmitter and receiver stop their functions, and neither the main power supply nor clock is assured. Thus, the transition to "L0" starts from the "Detect" state. Transition to the "L2" state is performed in response to an instruction from the data link layer and an ordered set.

"Disabled" State

When a link is set unusable and disable is designated from a higher layer or "Link Disabled" is set in an ordered set, the state shifts to the "Disabled" state.

"Loopback" State

The "Loopback" state is defined for a test and fault isolation.

Figure 4:
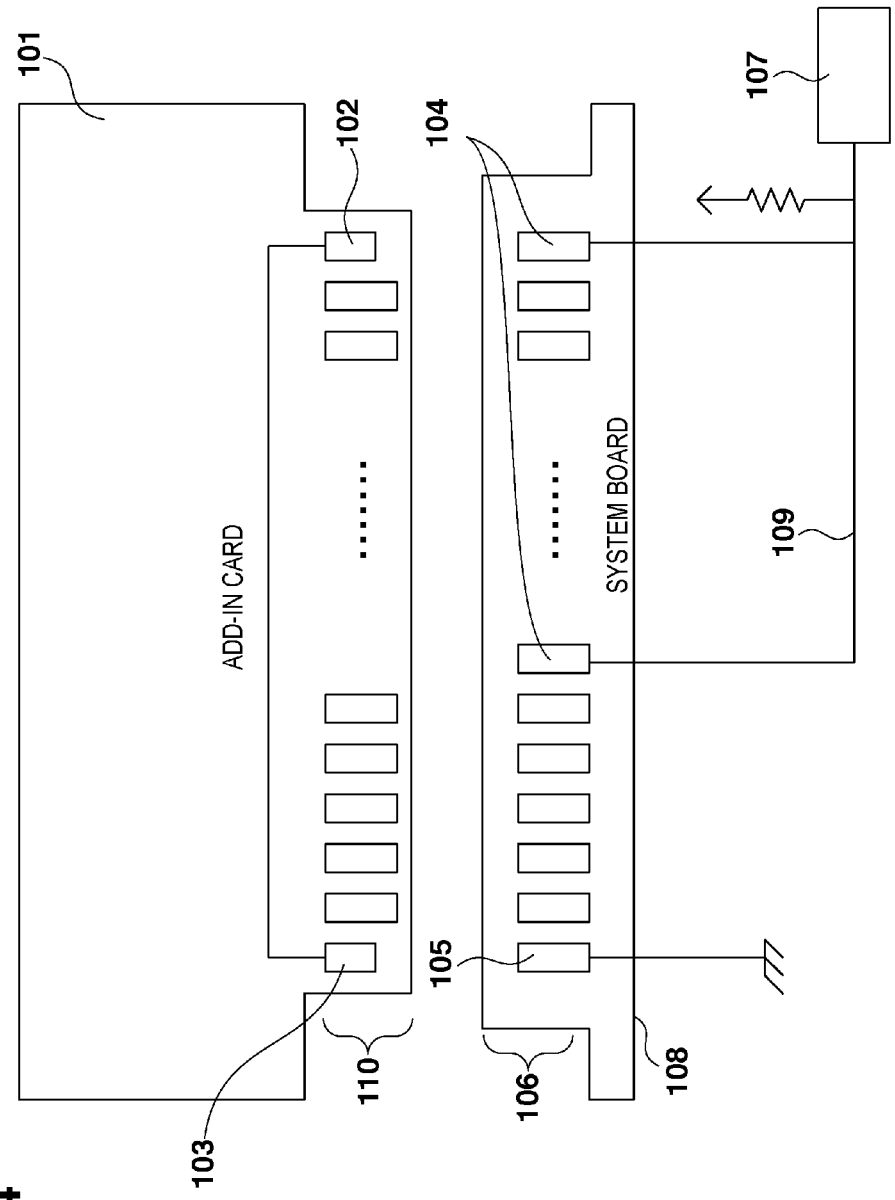
FIG. 4 is a view showing the card presence detect state of an add-in card 101 in the CEM specification.

FIG. 4 is a view showing the card presence detect state of an add-in card 101 in the CEM specification.

As shown in FIG. 4, the add-in card 101 and a system board 108 are connected via a card edge 110 of the add-in card 101 and a card edge connector 106 of the system board 108. A PCI-Express hot-plug controller 107 is connected to pins (PRSNT2# pins) 104 via signal lines (PRSNT2# lines) 109. The hot-plug controller 107 detects the presence of the add-in card 101 by detecting that the signal level of the pulled-up signal line (PRSNT2# line) 109 has changed to low (LOW).

The card edge pads of a signal pin (PRSNT1# pin) 103 and signal pin (PRSNT2# pin) 102 on the add-in card 101 are shorter than the remaining pads. With this structure, when the add-in card 101 is removed, the signal pin (PRSNT1# pin) 103 and signal pin (PRSNT2# pin) 102 are disconnected from the system board 108 before the remaining signal lines are disconnected. The hot-plug controller 107 can control the power switching element to stop power supply from the system board 108 to the add-in card 101.

The signal pin (PRSNT1# pin) 103 and signal pin (PRSNT2# pin) 102 are directly connected on the add-in card 101. Although the pin layout defines a plurality of pins (PRSNT2# pins) on a multi-lane (four lanes (×4) or more) add-in card 101, the most distant PRSNT2# and PRSNT1# pins are connected, as shown in FIG. 4.

On the system board 108, a pin (PRSNT1# pin) 105 is grounded (GND), and the pins (PRSNT2# pins) 104 are connected at once to the hot-plug controller 107 by one pull-up resistor. Regardless of the lane width of the connected add-in card 101, the hot-plug controller 107 can detect insertion of the add-in card 101. In the following description, a signal pin will be simply referred to as a pin.

[Description of Inkjet Printing Apparatus]

Figure 5A:
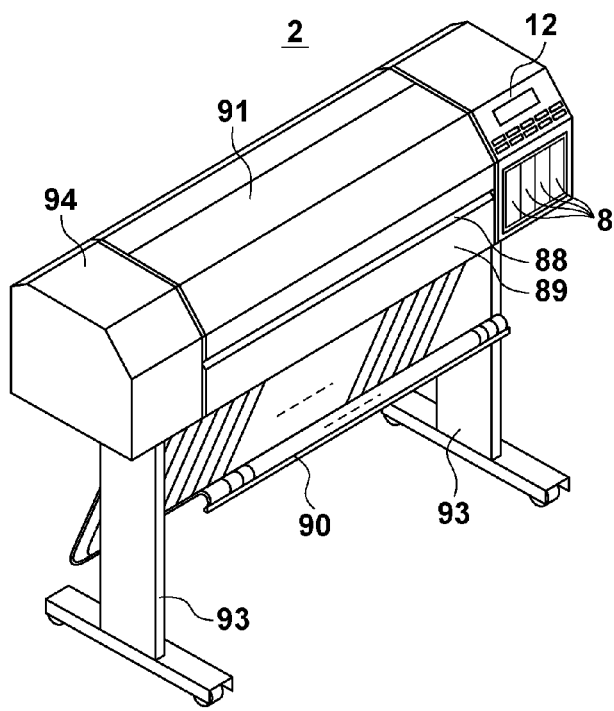
FIGS. 5A and 5B are perspective views showing the outer appearance of an inkjet printing apparatus as an exemplary embodiment of the present invention.
Figure 5B:
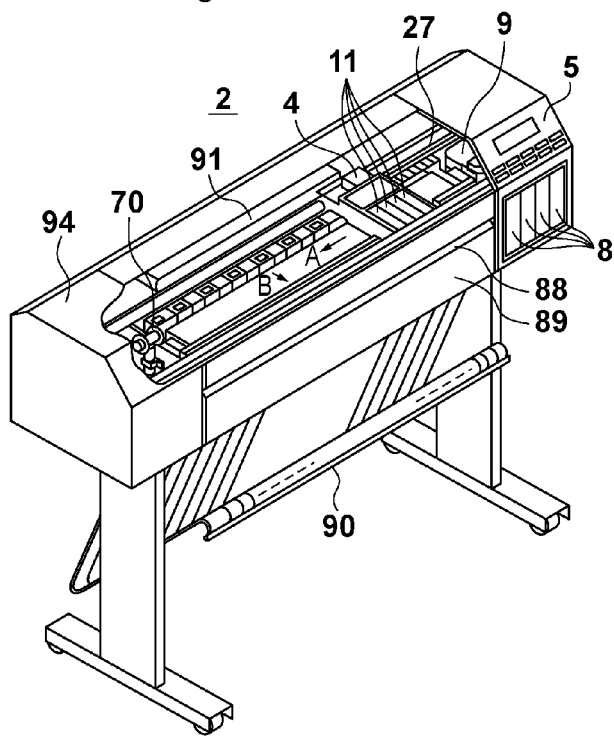

FIGS. 5A and 5B are perspective views showing the outer appearance of an inkjet printing apparatus as an exemplary embodiment of the present invention. FIG. 5B is a perspective view showing a state in which the upper cover of the inkjet printing apparatus shown in FIG. 5A is removed.

As shown in FIGS. 5A and 5B, an inkjet printing apparatus (to be referred to as a printing apparatus) 2 has a manual insertion port 88 on the front surface, and a roll paper cassette 89 which can open to the front side is arranged below the manual insertion port 88. A printing medium such as printing paper is supplied from the manual insertion port 88 or roll paper cassette 89 into the printing apparatus. The printing apparatus includes an apparatus main body 94 supported by two legs 93, a stacker 90 which receives a discharged printing medium, and an openable/closable see-through upper cover 91. A control unit 5, an operation panel 12, ink supply units, and ink tanks are arranged on the right side of the apparatus main body 94.

As shown in FIG. 5B, the printing apparatus 2 includes a conveyance roller 70 for conveying a printing medium such as printing paper in a direction (sub-scanning direction) indicated by an arrow B, and a carriage unit (to be referred to as a carriage) 4 which is guided and supported to be able to reciprocate in directions (indicated by an arrow A: main scanning direction) of width of the printing medium. The printing apparatus 2 further includes a carriage motor (not shown) for reciprocating the carriage 4 in directions indicated by the arrow A, a carriage belt (to be referred to as a belt) 27, and an inkjet printhead (to be referred to as a printhead) 11 mounted on the carriage 4. An ink suction recovery unit 9 is arranged at the end of the carriage scanning range to supply ink and cancel an ink discharge failure caused by clogging of the orifice of the printhead 11 or the like.

In this printing apparatus, the carriage 4 supports the printhead 11 formed from four heads in correspondence with four color inks to print in color on a printing medium. More specifically, the printhead 11 includes a K (blacK) head for discharging K ink, a C (Cyan) head for discharging C ink, an M (Magenta) head for discharging M ink, and a Y (Yellow) head for discharging Y ink.

In printing, the conveyance roller 70 conveys a printing medium to a predetermined printing start position. Then, the carriage 4 scans the printhead 11 in the main scanning direction, and the conveyance roller 70 conveys the printing medium in the sub-scanning direction. By repeating these operations, the printing apparatus prints on the entire printing medium.

More specifically, the belt 27 and carriage motor (not shown) move the carriage 4 in the directions indicated by the arrow A shown in FIG. 5B, thereby printing on a printing medium. The carriage 4 then returns to a position (home position) before scanning, and the conveyance roller conveys the printing medium in the sub-scanning direction (direction indicated by the arrow B shown in FIG. 5B). After that, the carriage scans again in the directions indicated by the arrow A in FIG. 5B, printing an image, text, or the like on the printing medium. After this operation is repeated to the end of printing of one printing medium, the printing medium is discharged into the stacker 90, completing printing of one printing medium.

Note that this apparatus can print on printing media at large sizes such as B0 and A0 sizes in conversion into a cut sheet.

Figure 6:
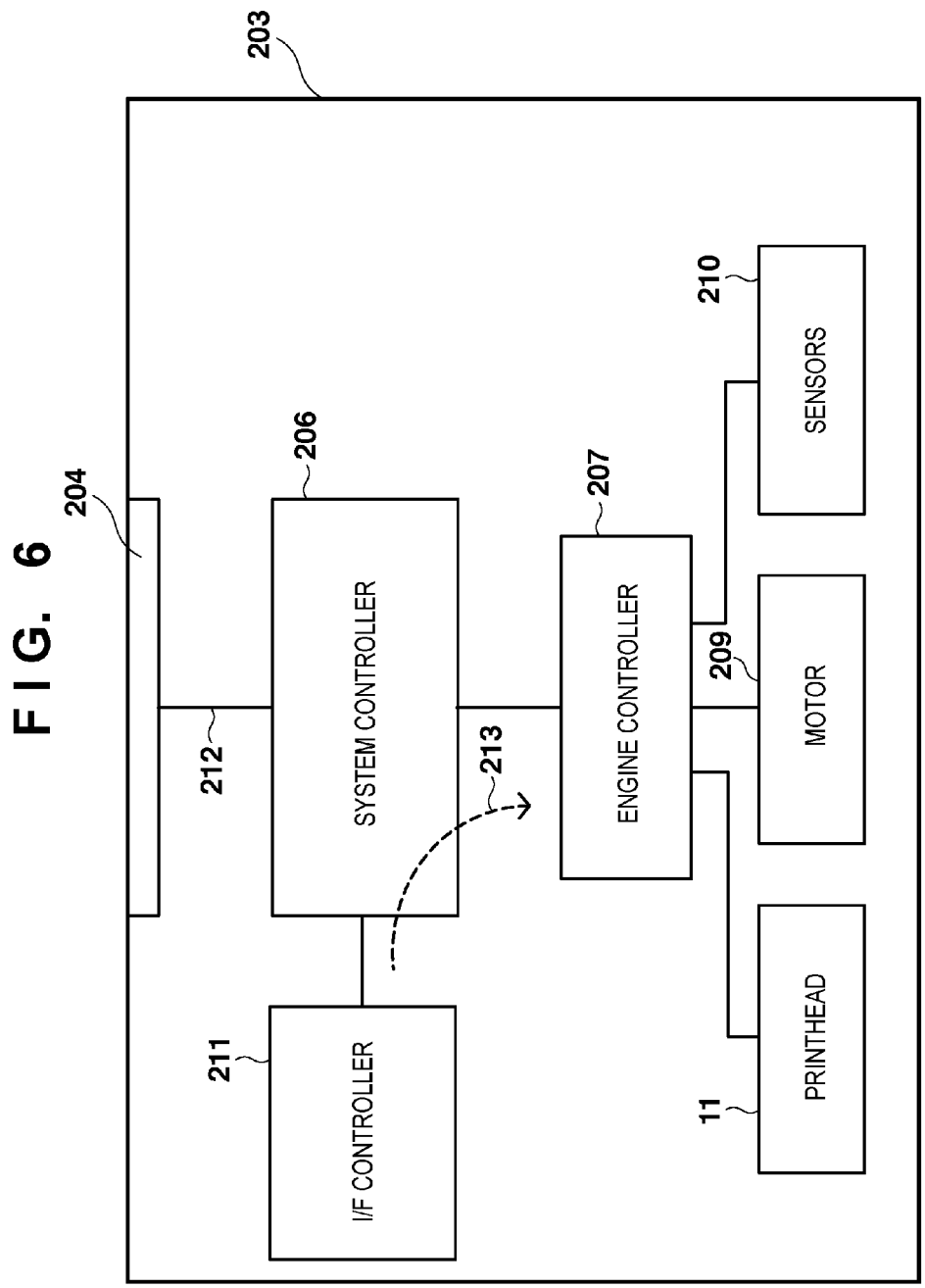
FIG. 6 is a block diagram showing the schematic arrangement of a system board 203 functioning as the controller of the printing apparatus.

FIG. 6 is a block diagram showing the schematic arrangement of a system board 203 functioning as the controller of the printing apparatus.

An I/F controller 211 is a device which enables communication with an external device (for example, a host computer) via a standard interface such as LAN. A system controller 206 has the functions of a CPU, PCI-Express interface, RAM, ROM, and image processor. The system controller 206 is connected to an engine controller 207, and controls image processing. In the system controller 206, a CPU-incorporated SOC (System On Chip), RAM, and ROM may be configured as discrete devices. The PCI-Express unit of the system controller 206 can set switching between a root-complex and an end-point in the operation setting mode. An extension slot 204 and the system controller 206 are connected via a PCI-Express signal line 212. The engine controller 207 is connected to the printhead 11, a motor 209, and various sensors 210.

In FIG. 6, a broken arrow 213 indicates the flow of print data. A host computer (to be referred to as a host) and the printing apparatus are connected via an interface cable conforming to a connection protocol. The host transmits print data. The print data is transferred to the system controller 206 via the I/F controller 211.

The system controller 206 converts multi-valued R, G, and B data transferred from the host into binary C, M, Y, and K data, and transfers the binary C, M, Y, and K data to the engine controller 207. C, M, Y, and K density data correspond to cyan, magenta, yellow, and black ink colors.

The motor 209 includes a carriage motor which moves, in the main scanning direction, the carriage 4 supporting the printhead 11, and a conveyance motor which conveys a printing medium in the sub-scanning direction. The engine controller 207 controls the motor 209 using various sensors 210. While moving/conveying the carriage 4 and printing medium, the engine controller 207 transfers binary print density data to the printhead 11 to print on the printing medium.

Several embodiments of an arrangement in which an accelerator board is mounted on the system board of the printing apparatus shown in FIGS. 5A and 5B will be described.

First Embodiment

Figure 7:
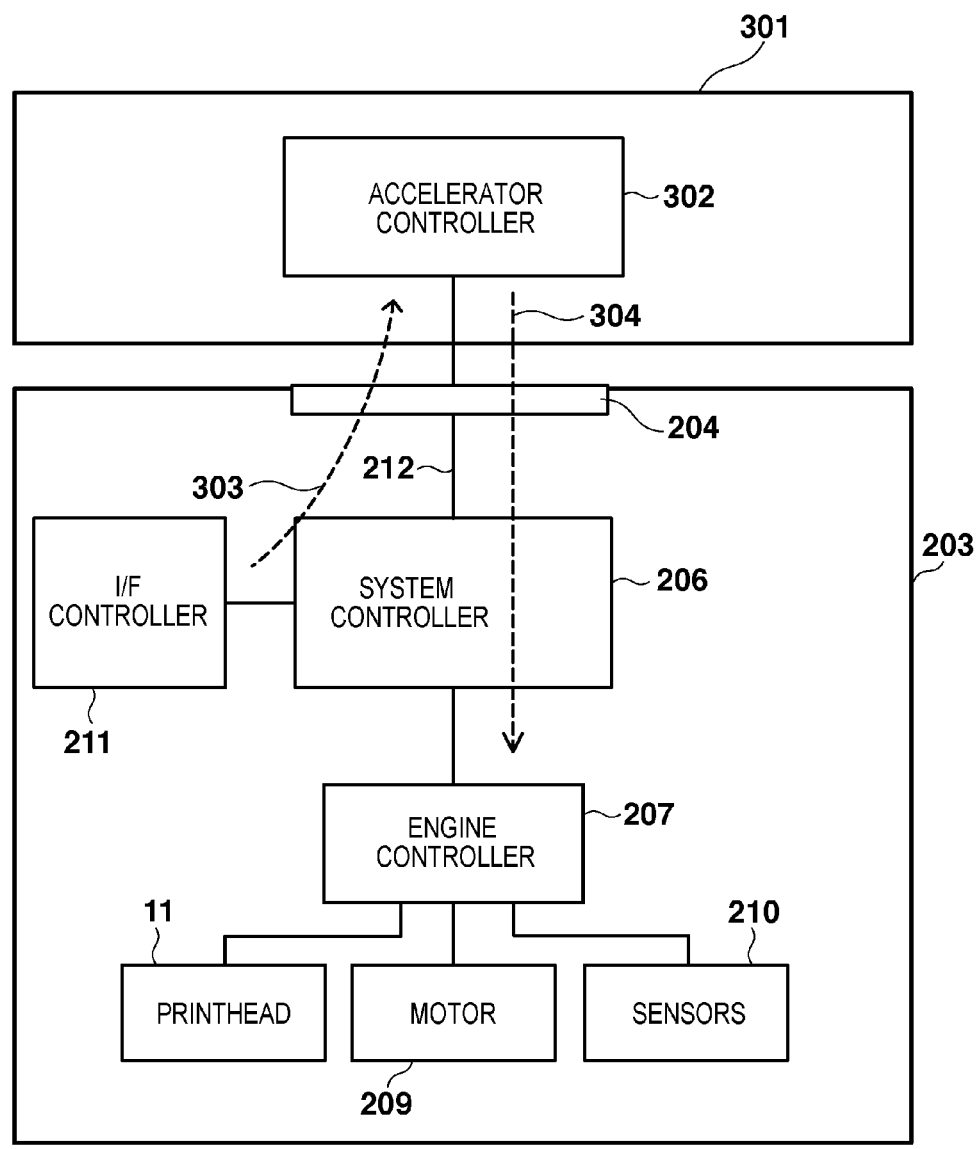
FIG. 7 is a block diagram showing a schematic control arrangement when an accelerator board is mounted on a system board.

FIG. 7 is a block diagram showing a schematic control arrangement when an accelerator board for improving performance is mounted on a system board.

An accelerator board 301 includes an accelerator controller 302. The accelerator controller 302 has the functions of a CPU, a root-complex complying with the PCI-Express specification, a RAM, a ROM, and an encryption unit. The accelerator controller 302 is connected to a system controller 206 via an extension slot 204. In the accelerator controller 302, an MCH (Memory Controller Hub), CPU, RAM, and ROM may be configured as discrete devices. The MCH is a PCI-Express root-complex and is connected to the system controller 206 serving as an end-point via a 4-lane PCI-Express signal line 212. The accelerator controller 302 is higher in CPU performance and memory performance than the system controller 206. The accelerator controller 302 performs interface processing and image processing requiring a high ratio of software control, and supports processing of the system controller 206.

In FIG. 7, broken arrows 303 and 304 indicate the flow of print data.

Print data transferred from the host is sent to the accelerator controller 302 via an I/F controller 211 and the system controller 206. The accelerator controller 302 performs interface processing, encryption processing, PDL interpretation, and the like for the received print data, and transmits the processing result as print data to the system controller 206. Subsequent processing has been described with reference to FIG. 6, and a description thereof will not be repeated.

FIG. 8 is a block diagram showing a schematic control arrangement when an extension interface board is mounted on a system board.

An extension interface (I/F) board 401 includes an interface (I/F) controller 402. The I/F controller 402 is an interface with a technical specification different from that of the I/F controller 211. The I/F controller 402 can be mounted on the system board 203 to enhance the functions of the printing apparatus. At this time, the I/F controller 402 serves as an end-point complying with the PCI-Express specification. The I/F controller 402 is connected to the system controller 206 serving as a root-complex via a PCI-Express signal line 212 having one lane (lane 0) or four lanes (lane 0, lane 1, lane 2, and lane 3). Here, a pair of differential transmission lines (transmission and reception) is expressed as a lane.

In FIG. 8, a broken arrow 403 indicates the flow of print data.

Print data from the host is sent to the system controller 206 via the I/F controller 402. Subsequent processing has been described with reference to FIG. 6, and a description thereof will not be repeated.

Next, a method of switching the system controller 206 between an end-point and a root-complex in accordance with the type of add-in card will be explained.

FIGS. 9A to 9D are block diagrams schematically showing the connection portions and peripheral portions of the PCI-Express interfaces of an add-in card and system board.

Figure 9A:
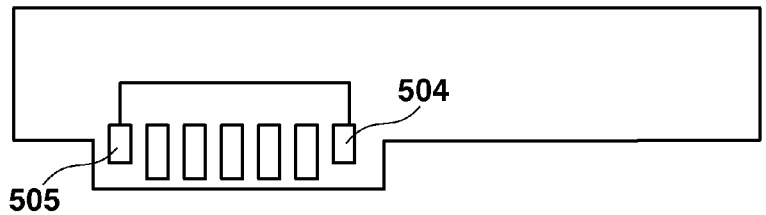
FIGS. 9A to 9D are block diagrams schematically showing the connection portions and peripheral portions of the PCI-Express interfaces of an add-in card and system board.
Figure 9B:
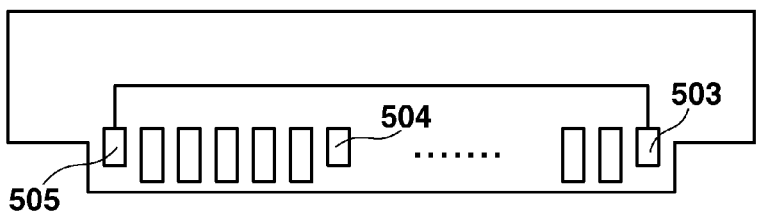

FIG. 9A shows a state in which a pin (PRSNT1# pin) 505 and pin (PRSNT2# (×1) pin) 504 are directly connected on an add-in card on which a ×1-lane end-point device is mounted. Between the pins 504 and 505, two pins are assigned for transmission data of lane 0, and two pins are assigned for reception data of lane 0. FIG. 9B shows a state in which the pin (PRSNT1# pin) 505 and a pin (PRSNT2# (×4) pin) 503 are directly connected on an add-in card on which a ×4-lane end-point device is mounted. Between the pins 503 and 505, two pins for transmission data and two pins for reception data are assigned for four lanes.

Figure 9C:
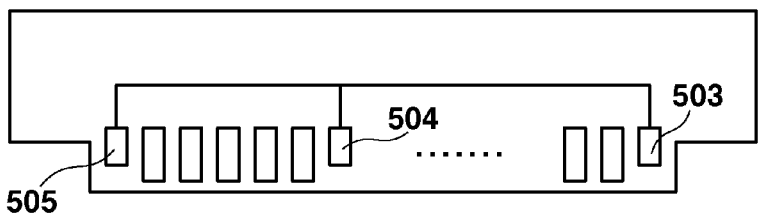
Figure 9D:
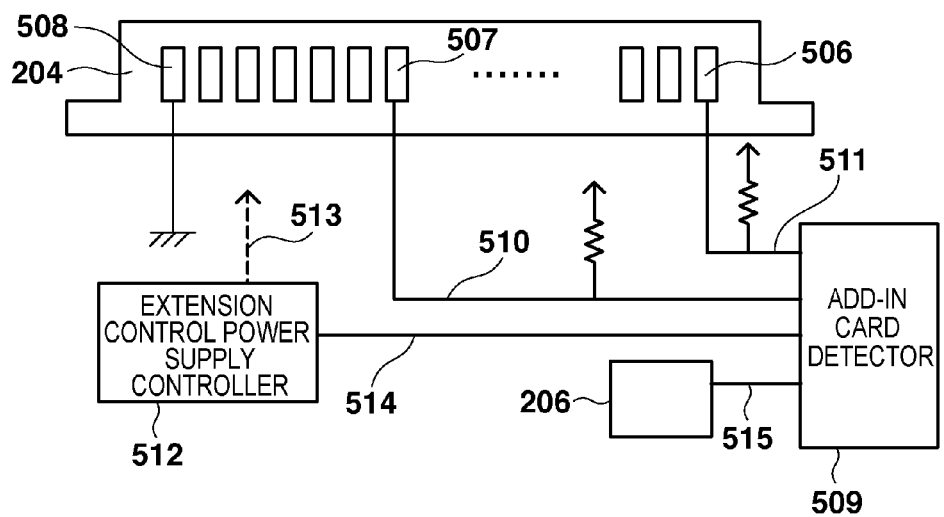

FIG. 9C shows an add-in card on which a ×4-lane root-complex device is mounted. FIG. 9C shows a state in which the pin (PRSNT1# pin) 505, pin (PRSNT2# (×1) pin) 504, and pin (PRSNT2# (×4) pin) 503 are directly connected on an add-in card. The pin assignment is the same as that in FIG. 9B. FIG. 9D shows the state of the pins of the system board 203. FIG. 9D shows a state in which a pin (PRSNT1# pin) 508, pin (PRSNT2# (×1)) 507, and pin (PRSNT2# (×4) pin) 506 corresponding to the card detection pins 503 to 505 of the add-in card are arranged in the extension slot 204. The pin (PRSNT1# pin) 508 is grounded (GND).

In this way, the type of add-in card is determined by the connection arrangement of a plurality of pins attached to the add-in card.

In this arrangement, the pins 507 and 506 are connected to an add-in card detector 509 via a pulled-up signal line (PRSNT2# (×1) line) 510 and signal line (PRSNT2# (×4) line) 511, respectively. The add-in card detector 509 is connected to an extension slot power supply controller 512 via an extension slot power supply control line 514. The extension slot power supply controller 512 supplies power to the extension slot 204 when the signal level of the extension slot power supply control line 514 changes to high (High).

The add-in card detector 509 is connected to the system controller 206 via an extension slot detection line 515. The system controller 206 switches to a root-complex when the signal level of the extension slot detection line 515 is high (High), and to an end-point when that signal level is low (Low).

FIG. 10 is a table showing the relationship between high and low signal voltage levels of input and output signals in the add-in card detector. In FIG. 10, the signal line (PRSNT2# (×1) line) 510 and signal line (PRSNT2# (×4) line) 511 are considered as input signals. The signal voltage levels of the extension slot power supply control line 514 and extension slot detection line 515 are considered as output signals. FIG. 10 shows signal voltage levels when add-in cards respectively shown in FIGS. 9A to 9C are mounted in the extension slot 204 and when no add-in card is mounted.

Figure 11:
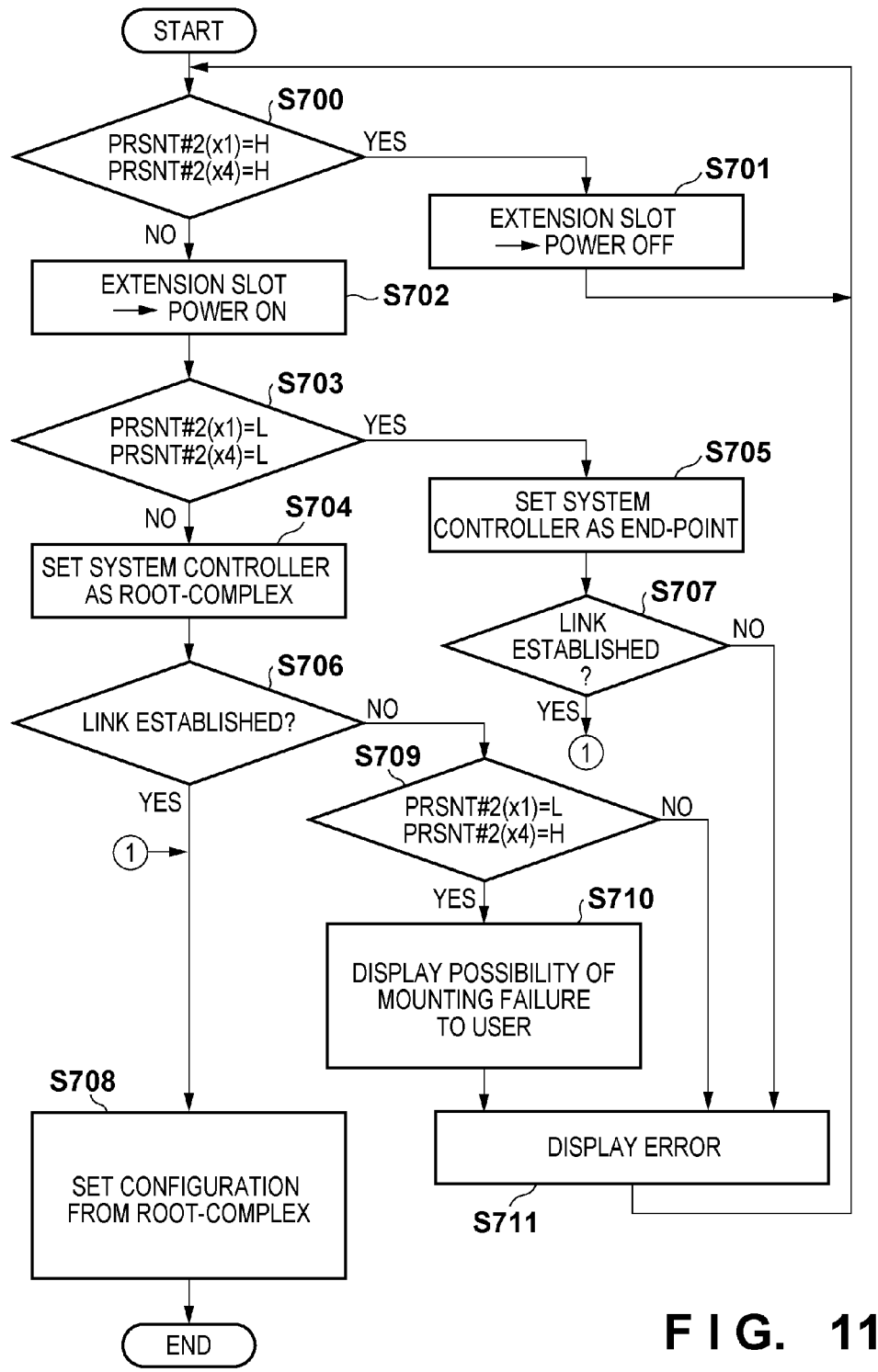
FIG. 11 is a flowchart showing a sequence of switching a system controller between an end-point and a root-complex in accordance with the type of add-in card.

FIG. 11 is a flowchart showing a sequence of switching the system controller between an end-point and a root-complex in accordance with the type of add-in card.

In step S700, it is checked whether or not an add-in card has been mounted in the extension slot 204. If no add-in card has been mounted in the extension slot 204, the signal levels of both the signal line (PRSNT2# (×1) line) 510 and signal line (PRSNT2# (×4) line) 511 are high. The signal level of the extension slot power supply control line 514 is low. In this case, the process shifts to step S701 to stop power supply to the extension slot 204.

If an add-in card has been mounted in the extension slot 204, the signal level of either the signal line 510 or 511 is low, that of the extension slot power supply control line 514 is high, and the process shifts to step S702. Power is supplied to the extension slot 204.

In step S703, it is checked whether or not the signal levels of both the signal line (PRSNT2# (×1) line) 510 and signal line (PRSNT2# (×4) line) 511 are low. If it is determined that these two signal levels are low, the process advances to step S705. If it is determined that either signal level is not low, the process advances to step S704. Then, it is determined that a PCI-Express device mounted on the add-in card is an end-point, and the system controller 206 initializes and sets the PCI-Express unit as a root-complex. After that, the process advances to step S706.

In step S705, it is determined that the PCI-Express device mounted on the add-in card is a root-complex, and the system controller 206 initializes and sets the PCI-Express unit as an end-point. The process then advances to step S707.

In both steps S706 and S707, it is checked whether or not a link has been established by performing initialization called a training sequence in the physical layer, and performing initialization of flow control in the data link layer. If it is determined that a link has been established, TLP packets become transmittable/receivable, and the process advances to step S708. A configuration TLP is transmitted from the root-complex to the end-point to set a configuration. As a result, initialization setting is completed.

If it is determined in step S706 that no link has been established, the process advances to step S709. In step S709, it is checked whether or not the signal level of the signal line (PRSNT2# (×1) line) 510 is low and that of the signal line (PRSNT2# (×4) line) 511 is high.

In the first place, the following state may occur in a case where an add-in card on which a PCI-Express device serving as a 4-lane root-complex is mounted is slantingly inserted into the extension slot 204. That is, only the pin (PRSNT2# (×4) pin) 503 of the add-in card and the pin (PRSNT2# (×4) pin) 506 of the system board 203 do not contact each other. In this case, the signal level of the signal line 510 becomes low, and that of the signal line 511 becomes high. The PCI-Express device mounted on the add-in card is recognized as a 1-lane end-point, so link establishment may have failed. In such a case, the process advances to step S710 to display the possibility of a mounting failure of the add-in card on the display unit of the operation panel 12 of the printing apparatus, and prompt the user to confirm the mounting. The process then advances to step S711.

To the contrary, if the determination in step S709 does not reveal that the signal level of the signal line 510 is low and that of the signal line 511 is high, or if it is determined in step S707 that no link has been established, the process advances to step S711. In step S711, the display unit of the operation panel 12 displays a message that the add-in card cannot be recognized.

According to the above-described embodiment, the system controller 206 can be initialized and set to an end-point or root-complex in accordance with the type of inserted add-in card. The printing apparatus becomes operable using the add-in card inserted into the printing apparatus regardless of whether the add-in card is an end-point device or root-complex device.

Second Embodiment

Figure 13:
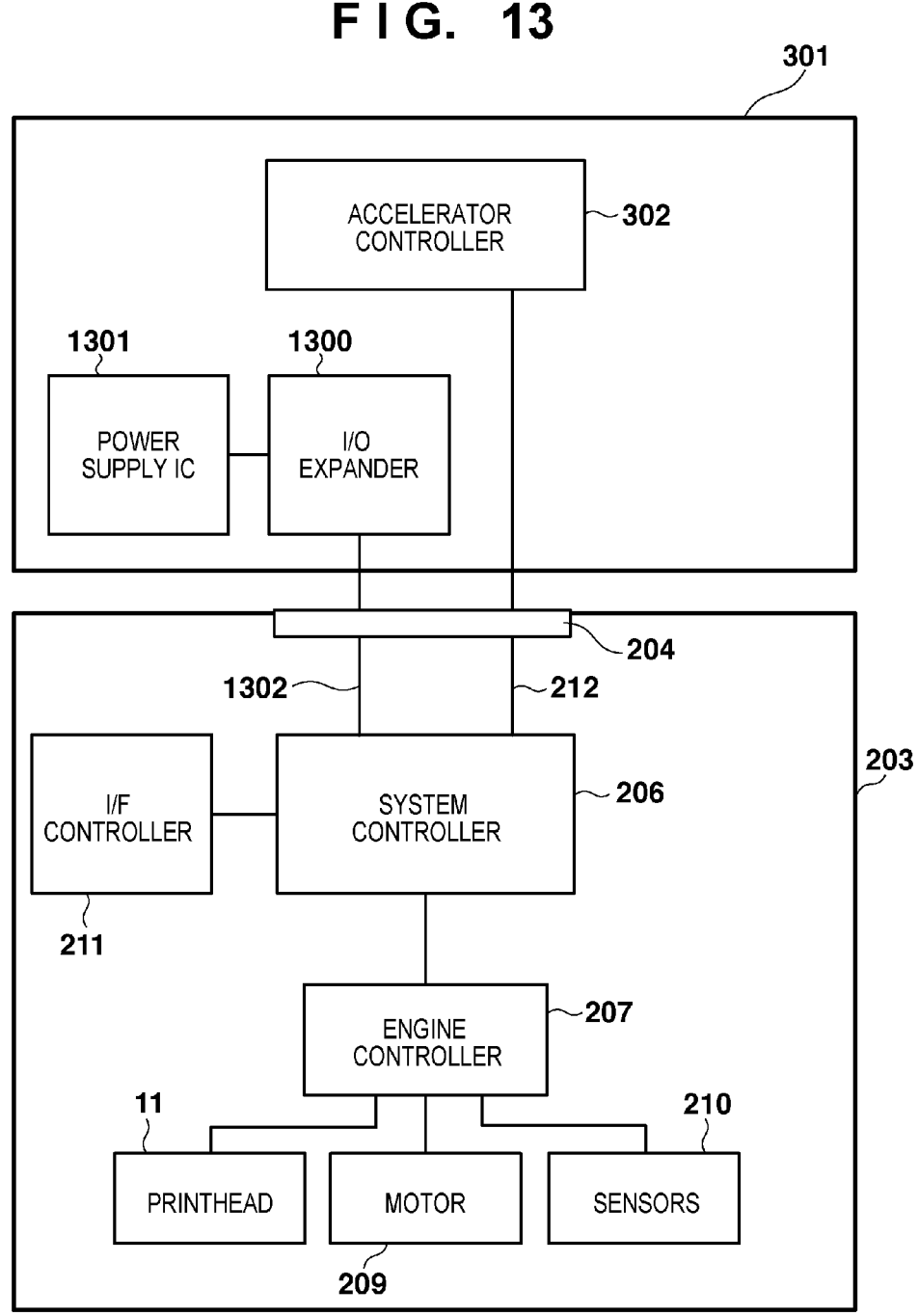
FIG. 13 is a block diagram showing a schematic arrangement when an accelerator board 301 is mounted on a system board 203 according to a second embodiment.

FIG. 13 is a block diagram showing a schematic arrangement when an accelerator board 301 is mounted on a system board 203 according to the second embodiment.

A print data processing sequence and the processing contents of print data on the accelerator board 301 are the same as those in the first embodiment, and a description thereof will not be repeated. As for the arrangement of the accelerator board 301, a description of the same arrangement as that in the first embodiment will not be repeated.

In the second embodiment, an I/O expander 1300 is mounted on the accelerator board 301 and connected to a system controller 206 via an I2C (Inter-Integrated Circuit) bus 1302. The system controller 206 controls a power supply IC 1301 and the like. The I/O expander 1300 is an input/output control circuit with a communication interface.

The power supply IC 1301 is a DC-DC converter which converts 12 V power supplied from the system board 203 to the accelerator board 301 via an extension slot 204 into a voltage for use in an accelerator controller 302. The power supply IC 1301 includes an enable terminal and can control power supply to the accelerator controller 302.

The signal line of the I/O expander 1300 and the enable terminal of the power supply IC 1301 are connected to each other, and the I/O expander 1300 can control output of the power supply IC 1301.

Figure 14:
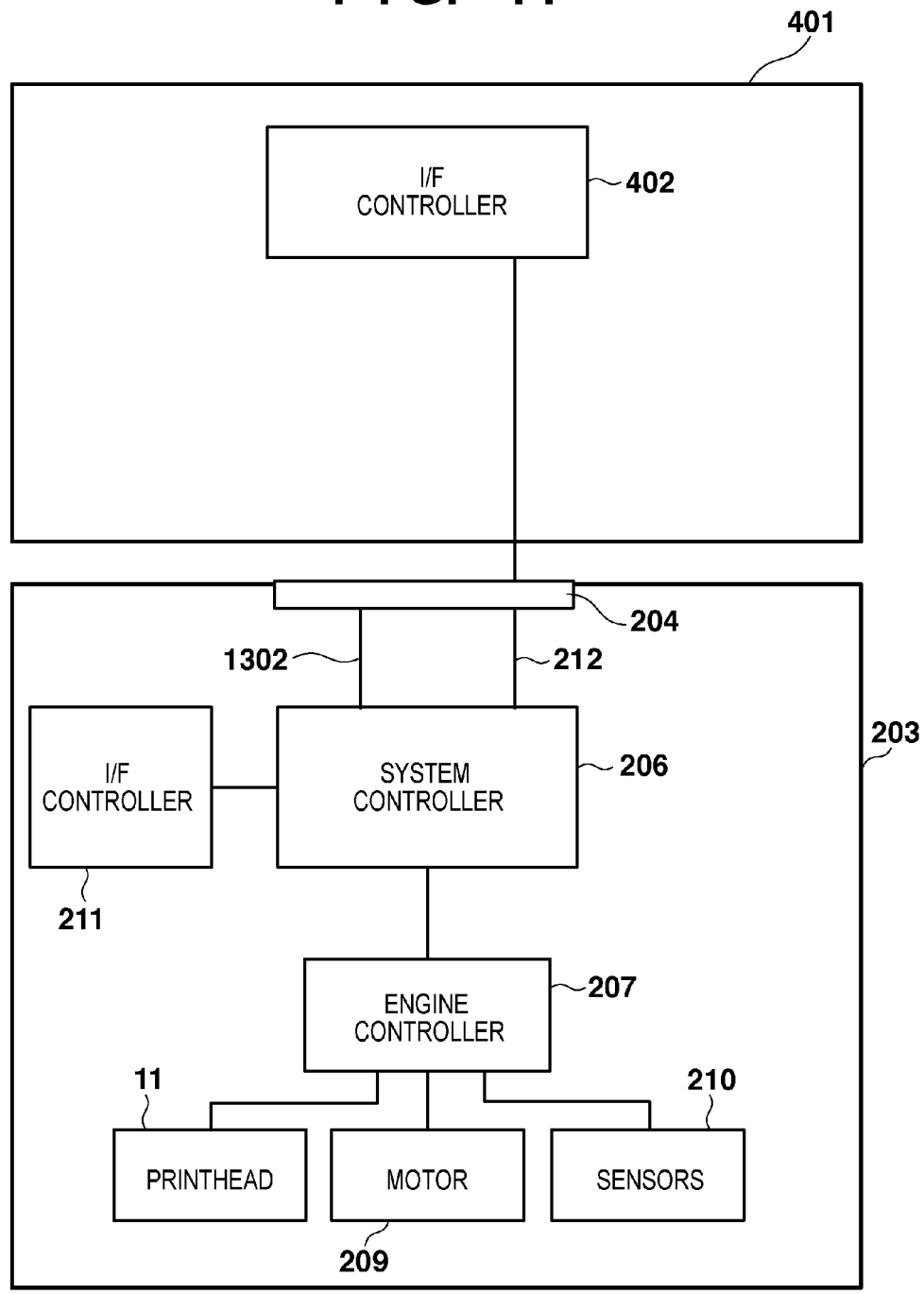
FIG. 14 is a block diagram showing a schematic arrangement when an extension interface board 401 is mounted on the system board 203.

FIG. 14 is a block diagram showing a schematic arrangement when an extension interface (I/F) board 401 is mounted on the system board 203.

The arrangement of the extension I/F board 401 is the same as that described in the first embodiment, and a description thereof will not be repeated. In FIG. 14, the I2C bus 1302 is wired from the system controller 206 to the extension connector 204. In the example of FIG. 14, no device is connected to the I2C bus 1302 on the extension I/F board 401.

Figure 15:
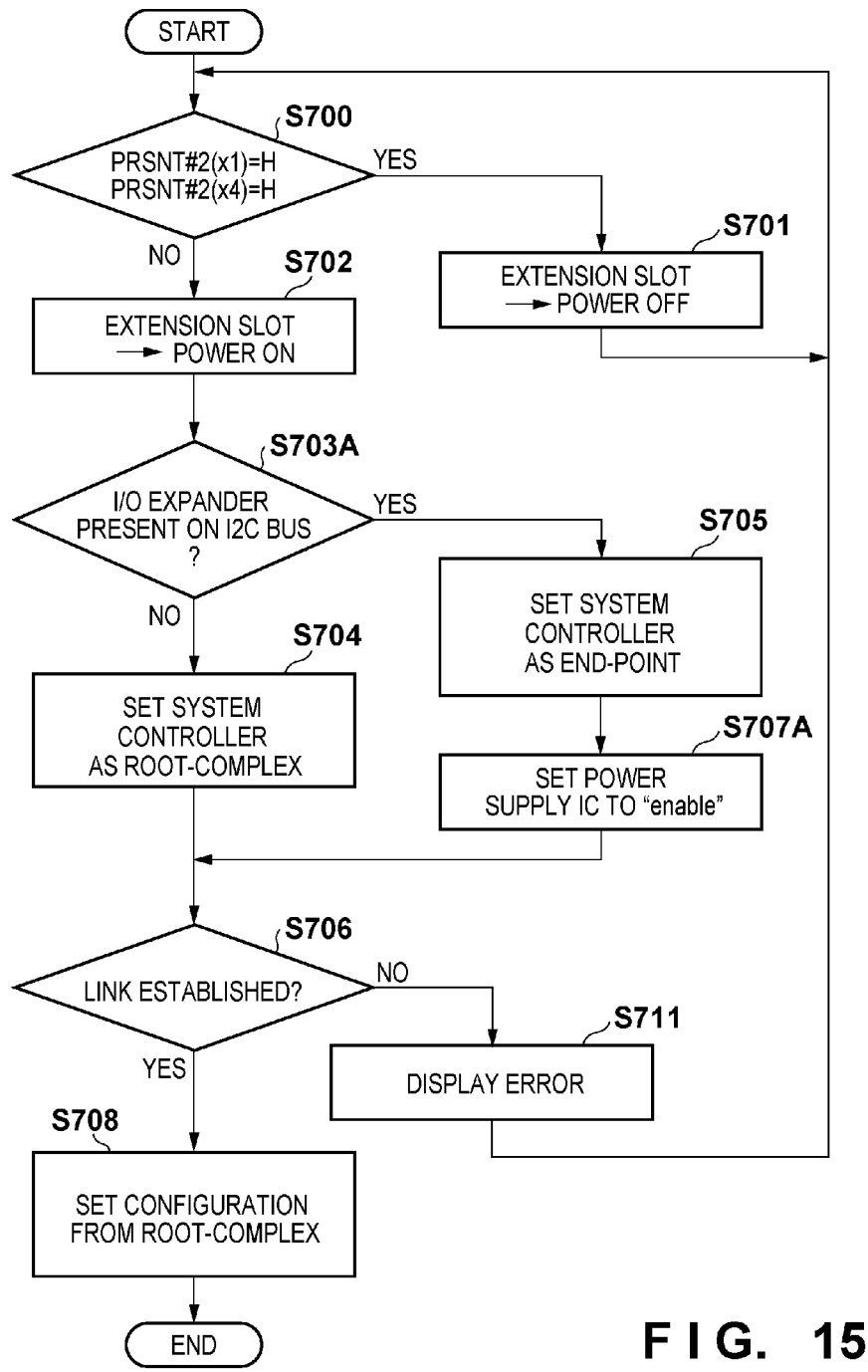
FIG. 15 is a flowchart showing a sequence of switching a system controller 206 between an end-point and a root-complex in accordance with the type of add-in board.

FIG. 15 is a flowchart showing a sequence of switching the system controller 206 between an end-point and a root-complex in accordance with the type of add-in board. In the second embodiment, the same card detection as the PCI-Express CEM specification as shown in FIGS. 9A and 9B is performed even when an add-in board is a root-complex. In FIG. 15, the same step reference numerals denote the same processes as those described with reference to the flowchart of FIG. 11 in the first embodiment, and a description thereof will not be repeated.

After processing in step S702, the system controller 206 makes an access via the I2C bus 1302 to check in step S703A whether or not the I/O expander 1300 is mounted on the accelerator board (add-in card) 301. If mounting of the I/O expander 1300 is confirmed, the process advances to step S705. It is determined that the PCI-Express device mounted on the add-in board is a root-complex. The system controller 206 initializes and sets the PCI-Express unit as an end-point.

In step S707A, the system controller 206 accesses the I/O expander 1300 via the I2C bus 1302 to set the power supply IC 1301 to "enable" and supply power to the accelerator controller 302 serving as a root-complex.

If mounting of the I/O expander 1300 on the add-in board is not confirmed in step S703A, the process advances to step S704 to execute processing described in the first embodiment. Also in steps S706, S708, and S711, processes described in the first embodiment are executed.

Figure 16:
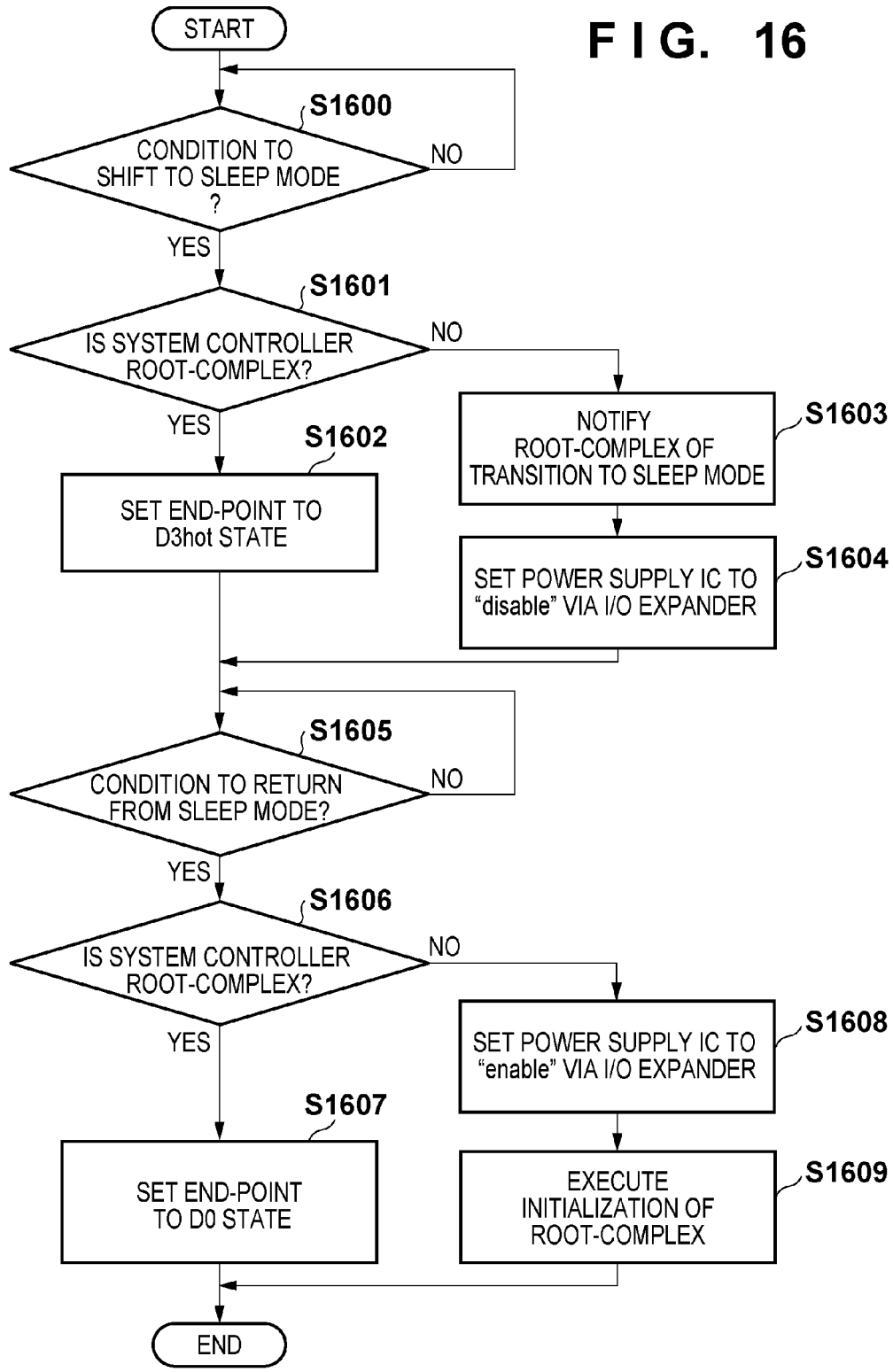
FIG. 16 is a flowchart showing a sequence of shifting to the SLEEP mode and returning from the SLEEP mode in accordance with the type of add-in board.

FIG. 16 is a flowchart showing a sequence of shifting to the SLEEP mode and returning from the SLEEP mode in accordance with the type of add-in board.

In step S1600, it is checked whether or not a condition to shift to the SLEEP mode has been met. In the second embodiment, when the inkjet printing apparatus has received neither print data nor a packet requiring a response such as an ARP packet within a predetermined set time or the inkjet printing apparatus has not been operated, it starts processing to enter the SLEEP mode.

If the condition to shift to the SLEEP mode has been met, the process advances to step S1601 to check whether or not the system controller 206 is a root-complex. If the system controller 206 is a root-complex, the process advances to step S1602 to set the end-point of the add-in board to the D3hot device state by a configuration access from the system controller 206. Then, the link state of a PCI-Express bus 212 shifts to L1.

To the contrary, if the system controller 206 is an end-point, the process advances to step S1603, and the system controller 206 notifies the root-complex of the add-in board of execution of transition to the SLEEP mode. The accelerator controller 302 serving as a root-complex performs shutdown processing. In step S1604, the system controller 206 confirms shutdown processing of the accelerator controller 302, and accesses the I/O expander 1300 via the I2C bus 1302 to set the power supply IC 1301 to "disable" and stop power supply to the accelerator controller 302.

After shifting to the SLEEP mode, it is monitored in step S1605 whether or not a condition to return from the SLEEP mode has been met. When the inkjet printing apparatus receives print data or a packet requiring a response such as an ARP packet or there is any operation to the inkjet printing apparatus in the SLEEP mode, it starts processing to return from the SLEEP mode to the normal mode.

If the condition to return from the SLEEP mode has been met, the process advances to step S1606 to check whether or not the system controller 206 is a root-complex. If the system controller 206 is a root-complex, the process advances to step S1607 to set the end-point of the add-in board to the D0 device state by a configuration access from the system controller 206. Then, the link state of the PCI-Express bus 212 shifts to L0.

If the system controller 206 is an end-point, the process advances to step S1608, and the system controller 206 accesses the I/O expander 1300 via the I2C bus 1302 to set the power supply IC 1301 to "enable" and supply power to the accelerator controller 302. In step S1609, the accelerator controller 302 serving as a root-complex is initialized, and the link of the PCI-Express bus 212 is established. The link state then shifts to L0.

As described above, according to the second embodiment, it is determined from a response from the device of the I2C bus whether the PCI-Express device of an add-in board is a root-complex or end-point. The printing apparatus can cope with initialization upon power-on and transition to the SLEEP mode.

In the second embodiment, the discrimination of a root-complex or end-point is made based on a device connected to the I2C bus. However, the same discrimination may be made using another interface.

In the above description, power supply is stopped in a case where the PCI-Express device of an add-in board is a root-complex when shifting to the SLEEP mode. However, another control may be executed as long as power consumption can be reduced. Further, although a case where the PCI-Express device of an add-in board is an end-point and the device state is D3hot when shifting to the SLEEP mode has been described as above, another device state may be set as long as power consumption can be reduced.

Third Embodiment

FIG. 17 is a block diagram showing a schematic arrangement when an accelerator board 301 is mounted on a system board 203 according to the third embodiment.

A print data processing sequence and the processing contents of print data on the accelerator board 301 are the same as those in the first and second embodiments, and a description thereof will not be repeated. As for the arrangement of the accelerator board 301, a description of the same arrangement as those in the first and second embodiments will not be repeated.

In the third embodiment, an I2C bus and power supply line between the accelerator board 301 and the system board 203 are connected via connectors 1702 and 1703. A PCI-Express bus is connected via connectors 1700 and 1701.

Figure 18:
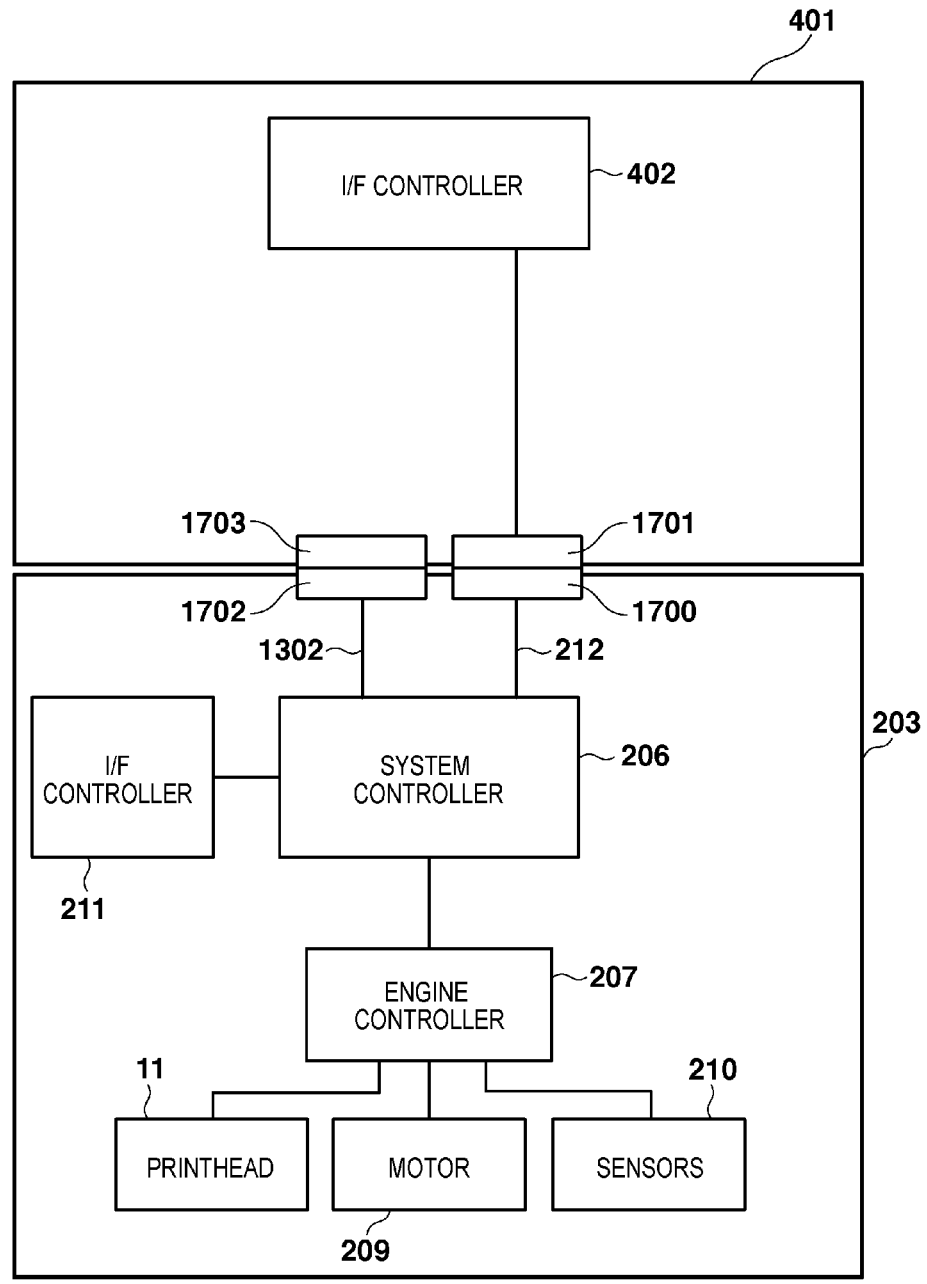
FIG. 18 is a block diagram showing a schematic arrangement when an extension interface board 401 is mounted on the system board 203.

FIG. 18 is a block diagram showing a schematic arrangement when an extension interface (I/F) board 401 is mounted on the system board 203.

The arrangement of the extension I/F board 401 is the same as that described in the first embodiment, and a description thereof will not be repeated. In FIG. 18, an I2C bus 1302 is wired from a system controller 206 to a connector 1702. In the example of FIG. 18, no device is connected to the I2C bus 1302 on the extension I/F board 401.

In the third embodiment, the power supply line between the extension I/F board 401 and the system board 203 is connected via the connectors 1702 and 1703, and the PCI-Express bus is connected via the connectors 1700 and 1701.

Figure 19:
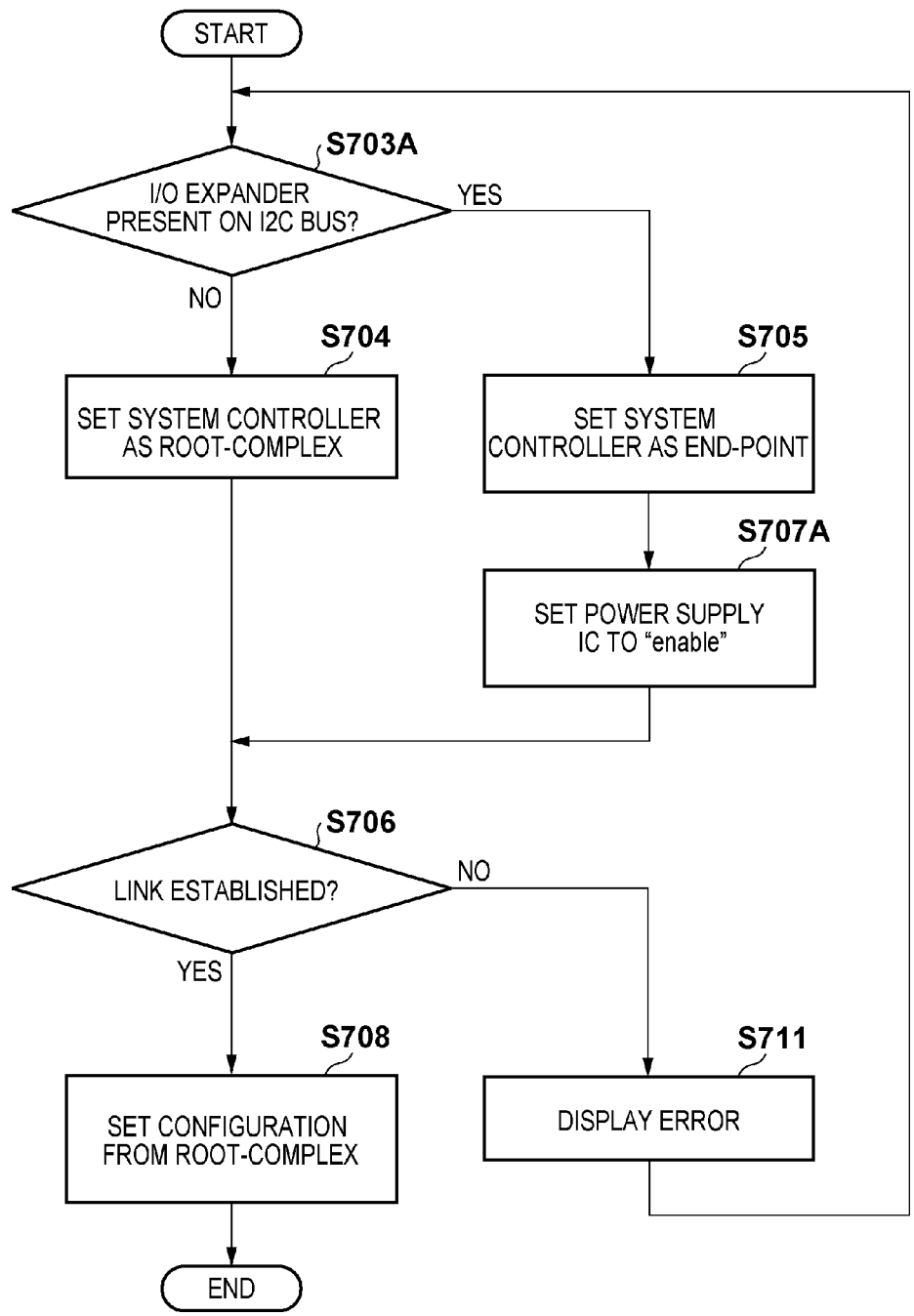
FIG. 19 is a flowchart showing a sequence of switching a system controller 206 between an end-point and a root-complex in accordance with the type of add-in board.

FIG. 19 is a flowchart showing a sequence of switching the system controller 206 between an end-point and a root-complex in accordance with the type of add-in board. The third embodiment will explain a case where the system board 203 does not have the add-in board/card detection function. In FIG. 19, the same step reference numerals denote the same processes as those described with reference to the flowchart of FIG. 11 in the first embodiment and the flowchart of FIG. 15 in the second embodiment, and a description thereof will not be repeated.

In step S703A of FIG. 19, the system controller 206 makes an access via the I2C bus 1302 to check whether or not an I/O expander 1300 is mounted on the add-in board. Subsequent processing is the same as that shown in FIG. 15.

As described above, according to the third embodiment, even when the system board 203 does not have the add-in board/card detection function, the system controller 206 can switch to an end-point or root-complex in accordance with the type of add-in board.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-230097, filed Oct. 12, 2010, which is hereby incorporated by reference herein in its entirety.

What is claimed is:

1. A printing apparatus capable of functional enhancement by mounting an add-in card, comprising:
    a discrimination unit constructed to discriminate whether or not the mounted add-in card includes an I/O expander; and
    a setting unit constructed to set an operation setting mode of a controller of the printing apparatus as a root complex in a case where said discrimination unit discriminates that the mounted add-in card does not include the I/O expander, and set the operation setting mode of the controller of the printing apparatus as an end-point in a case where said discrimination unit discriminates that the mounted add-in card includes the I/O expander.

2. The apparatus according to claim 1, further comprising a display unit constructed to display an error message in a case where a link is not established after the root complex or the end-point is set to the operation setting mode of the controller.

3. The apparatus according to claim 1, further comprising a control unit constructed to control power supply to an extension slot to an ON state in a case where the add-in card has been mounted to the extension slot.

4. The apparatus according to claim 3, further comprising a determination unit constructed to determine whether or not the add-in card has been mounted in the extension slot;
    wherein the add-in card and the extension slot have a plurality of signal pins arranged in correspondence with each other to connect the add-in card and the extension slot,
    a type of the add-in card is determined by a connection arrangement of the plurality of signal pins arranged in the add-in card,
    said determination unit determines, in accordance with signal levels detected at the plurality of signal pins arranged in the extension slot, whether or not the add-in card has been mounted, and
    said discrimination unit discriminates the type of the add-in card based on signal levels from corresponding signal pins connected to each other when the add-in card has been mounted.

5. The apparatus according to claim 4, wherein the signal pin is a card detection pin complying with the PCI-Express specification.

6. The apparatus according to claim 1, wherein the add-in card and the controller are connected by a serial bus, and
    the serial bus complies with a PCI-Express specification.

7. The apparatus according to claim 1, wherein the add-in card is one of an interface board to be connected to the printing apparatus and an accelerator board which enhances performance of the printing apparatus.

8. The apparatus according to claim 7, wherein the accelerator board is connected to the controller via an Inter-Integrated Circuit bus, and
    said discrimination unit discriminates that the accelerator board has been mounted via the Inter-Integrated Circuit bus.

9. The apparatus according to claim 1, wherein the printing apparatus includes a normal operation mode and a SLEEP mode,
    and further comprising:
    a monitoring unit constructed to monitor whether or not the printing apparatus has met a condition to shift from the normal operation mode to the SLEEP mode;
    a judging unit constructed to judge whether the operation setting mode of the controller is set as a root complex or an end-point in a case where said monitoring unit determines that the printing apparatus has met the condition to shift from the normal operation mode to the SLEEP mode; and
    a second setting unit constructed to set a status of the mounted add-in card to a predetermined mode in which a connection link between the controller and the mounted add-in card is recovered in a case where said judging unit judges that the operation setting mode of the controller is set as a root complex.

10. An operation setting method of a printing apparatus to which an add-in card is mounted, to achieve functional enhancement by inserting the add-in card, comprising:
    discriminating whether or not the mounted add-in card includes an I/O expander;
    setting an operation setting mode of a controller of the printing apparatus as a root complex in a case where it is discriminated that the mounted add-in card does not include the I/O expander; and
    setting the operation setting mode of the controller of the printing apparatus as an end-point in a case where it is discriminated that the mounted add-in card includes the I/O expander.

* * * * *